(12) United States Patent
Nosaka et al.

(10) Patent No.: US 7,040,989 B2
(45) Date of Patent: May 9, 2006

(54) POWER TRANSMISSION DEVICE

(75) Inventors: Michiyasu Nosaka, Anjo (JP); Kiyoshi Kurohata, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/445,928

(22) Filed: May 28, 2003

(65) Prior Publication Data

US 2003/0224904 A1 Dec. 4, 2003

(30) Foreign Application Priority Data

May 29, 2002 (JP) .............................. 2002-155160

(51) Int. Cl.
*F16D 9/04* (2006.01)

(52) U.S. Cl. ........................................ 464/32; 417/319
(58) Field of Classification Search ................. 464/32, 464/33; 403/2; 417/319; 474/70
See application file for complete search history.

(56) References Cited

U.S. PATENT DOCUMENTS 1,040,980 A * 10/1912 Haney .................... 417/319 X
2,566,690 A * 9/1951 Wright ....................... 464/32
3,359,171 A * 12/1967 Hanke ..................... 464/32 X
3,424,263 A * 1/1969 Black ...................... 464/32 X
4,219,286 A * 8/1980 Lindenthal ................ 464/32 X
5,800,137 A 9/1998 Eitai et al.
6,332,842 B1 * 12/2001 Tabuchi et al. ............... 464/33

FOREIGN PATENT DOCUMENTS

JP  A-8-319945  12/1996

* cited by examiner

*Primary Examiner*—Greg Binda
(74) *Attorney, Agent, or Firm*—Posz Law Group, PLC

(57) ABSTRACT

A power transmission device which interrupts torque transmission when the torque exceeds a predetermined torque. A torque limiter includes projections formed on a center hub and a pulley. The center hub includes bridges that transmit torque by a pulling force. When a preset torque limit is reached, the projections on the center hub make contact with and move along slanted faces so as to move the center hub in an axial direction relative to the pulley. The bridges are thereby subjected to a bending moment in addition to the pulling force when the torque exceeds the preset torque level, so that the bridges break precisely above the preset torque level due to the reduced fatigue limit.

18 Claims, 9 Drawing Sheets

AXIAL DIRECTION

POWER TRANSMISSION DEVICE

CROSS REFERENCE TO RELATED APPLICATION

This application is based upon, claims the benefit of priority of, and incorporates by reference, the contents of Japanese Patent Application No. 2002-155160 filed May 29, 2002.

BACKGROUND OF THE INVENTION

1. Field of the Invention

The present invention relates to a power transmission device such as a pulley or electromagnetic clutch suitably used for driving a compressor for an air conditioning system, and more particularly to its torque limiting mechanism that interrupts torque transmission when the torque exceeds a predetermined torque level.

2. Description of the Related Art

Torque limiting mechanisms provide overload protection to drive source components such as belts by interrupting torque transmission when the driven side (i.e. driving) equipment is inhibited from rotating by a failure such as seizure of the sliding and rotating parts of a compressor.

One prior art example of a power transmission device having a torque limiting function is shown in Japanese Patent Laid-Open Publication No. Hei 8-319945. The device takes the form of a disk-like pulley having an annular groove formed with evenly spaced through holes so as to reduce the strength of the pulley. The groove breaks when the applied torque exceeds a predetermined torque level, thereby interrupting power transmission.

The method of interrupting power transmission by using a breakable part in the transmission path as with the above prior art example can be realized with a simple construction and offers the advantage of a low production cost. On the other hand, it involves difficulties in designing the breakable part for the following reasons.

The breakable part is designed to break when applied with a predetermined torque (referred to as "breakaway torque") T1, while it is known that fatigue fracture occurs at a lower torque than the breakaway torque. Thus, the strength of the breakable part is set in consideration of its fatigue torque limit so that the peak torque during normal use should be set lower than the fatigue torque limit of the breakable part, as shown in FIG. 11.

In actuality, the torque limiting mechanism does not interrupt power transmission instantly when the preset torque limit is reached but sometime after the torque exceeds the limit. The range within which the torque limiting mechanism may be actuated is termed the "operation range" in this specification. The upper limit of this operation range is normally set to be a torque at which a malfunction occurs in the drive source components, an example of which is belt slippage.

However, in some cases depending on the material and shape of the breakable part, the average torque when the one-sided amplitude torque is zero, i.e., the average torque value at which the breakable part nearly always breaks may be higher than this upper limit of the operation range as can be seen from FIG. 11 (shown by a solid line).

This could be prevented by setting the torque limit line of the fatigue characteristics of the torque limiting mechanism as indicated by a dashed line in FIG. 11, so that the breakaway average torque does not exceed the upper limit of the operation range. However, this will greatly reduce the allowance between the peak torque during normal use and the fatigue limit of the breakable part, thus increasing the risk that the breakable part will break due to fatigue during normal use.

SUMMARY OF THE INVENTION

In view of the foregoing, an object of the present invention is to provide a power transmission device having a novel construction so that it can interrupt power transmission at a preset torque limit. To achieve the above object, according to a first aspect of the present invention, a power transmission device for transmitting power generated by a drive source to a driven device includes a breakable part (13d) which breaks and interrupts torque transmission. The interruption of torque transmission occurs when the transmitted torque exceeds a predetermined torque level. Also included is a means for inducing breakage 11c, 13b, 14, 15 that applies a force to the breakable part 13d in a different direction, from that of a force applied to the breakable part 13d when the transmitted torque is within the predetermined torque level, when the transmitted torque exceeds the predetermined torque level.

With this construction, the fatigue limit of the breakable part 13d is made lower than it normally is after the torque has exceeded the predetermined torque level. Therefore, the breakable part 13d will reliably break before the torque reaches the upper limit of the operation range. The present invention thus provides a power transmission device with a novel construction that can interrupt power transmission precisely at a preset torque limit without sacrificing safety during normal use, i.e., without inducing the risk of fatigue fracture of the breakable part 13d.

According to a second aspect of the invention, the breakable part 13d is a bar-like member. The bar-like member extends orthogonally to the axial direction, and the means for inducing breakage 11c, 13b, 14, 15 applies a force substantially parallel to the axial direction of the breakable part 13d when the transmitted torque exceeds the predetermined torque level to cause bending stress in the breakable part 13d.

According to a third aspect of the invention, a power transmission device for transmitting power generated by a drive source to a driven device has a driving-source side rotating member 11 driven to rotate by torque transmitted from the drive source 7. Additionally, a driven-device side rotating member 13 is operatively connected to the driven device to rotate with the driven device 1. The power transmission device also has a torque transmission part 11c, 13b, 14 for transmitting torque from the driving-source side rotating member 11 to the driven-device side rotating member 13, including a driving-source side projection 11c formed on the driving-source side rotating member 11, a driven-device side projection 13b formed on the driven-device side rotating member 13, and a resilient member 14 interposed between the driving-source side projection 11c and the driven-device side projection 13b.

Finally the power transmission device has a breakable part 13d which breaks and interrupts torque transmission when the transmitted torque exceeds a predetermined torque level and a means for inducing breakage that causes bending stress in the breakable part 13d by changing relative positions of the driving-source side rotating member 11 and the driven-device side rotating member 13 in an axial direction of rotation when a preset limit of phase difference between the driving-source side rotating member 11 and the driven-device side rotating member 13 is exceeded. With this construction, the fatigue limit of the breakable part 13d is made lower than it normally is after the torque has exceeded the predetermined torque level, whereby the breakable part 13d will reliably break before the torque reaches the upper limit of the operation range.

The present invention thus provides a power transmission device with a novel construction that can interrupt power transmission precisely at a preset torque limit without limiting safety requirements during normal use, i.e., without inducing the risk of fatigue fracture of the breakable part 13d.

According to a fourth aspect of the invention, the means for inducing breakage may be formed, for example, by a slanted face 15 formed on either one 11c of the driving-source side projection 11c or the driven-device side projection 13b, such that it generates a force in the axial direction by contact between the slanted face 15 and the other one 13c of the driving-source side projection 11c or the driven-device side projection 13b. The relative positions of the driving-source side rotating member 11 and the driven-device side rotating member 13 are changed in the axial direction.

According to a fifth aspect of the invention, the means for inducing breakage may be formed by a slanted face 15 formed at least on either one of the driven-device side rotating member 13 or the resilient member 14, such that it generates a force in the axial direction by contact between the slanted face 15 and the other one 13f of the driven-device side rotating member 13 or the resilient member 14, whereby the relative positions of the driving-source side rotating member 11 and the driven-device side rotating member 13 are changed in the axial direction. According to a sixth aspect of the invention, the breakable part 13d is preferably a bar-like member extending orthogonally to the axial direction and formed on the driven-device side rotating member 13.

Incidentally, the parenthesized numerals accompanying the foregoing description correspond with the embodiments to be described later in the detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

(First Embodiment)

Figure 1:
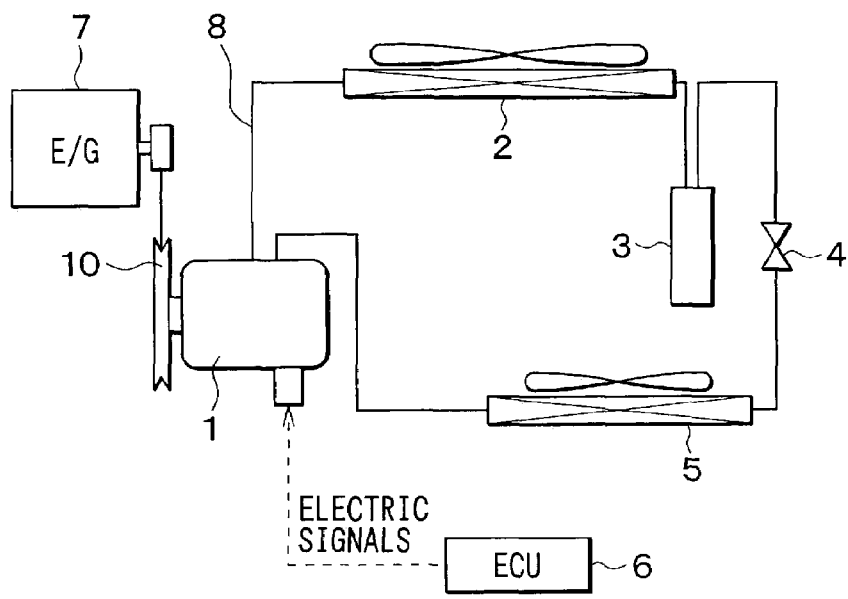
FIG. 1 is a model diagram of a vehicle air conditioning system having a vapor compression refrigeration system.
Figure 3:
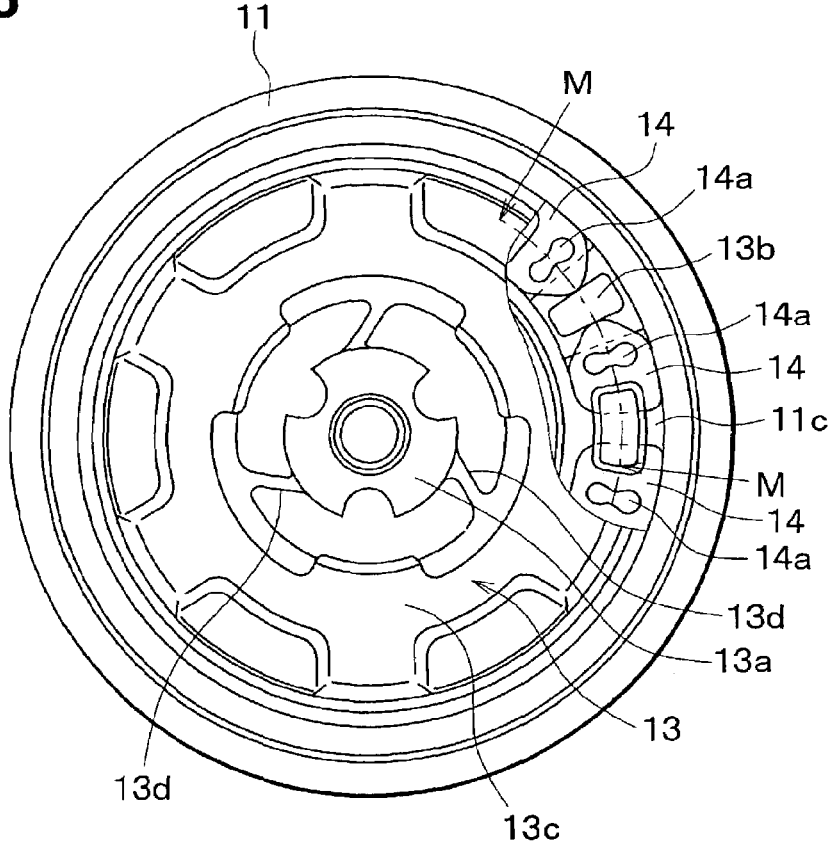
FIG. 3 is a view taken from the direction of arrow A of FIG. 2.
Figure 2:
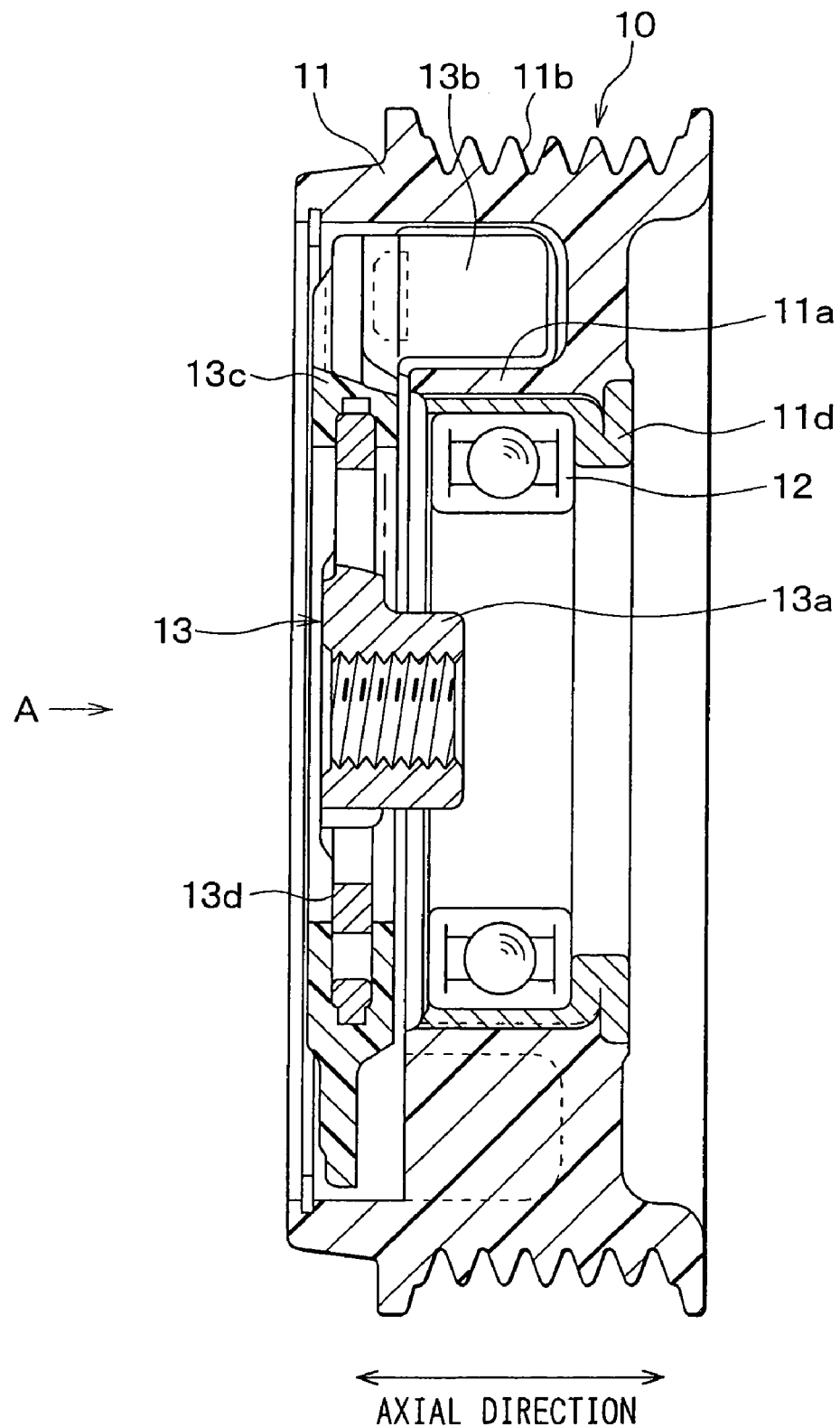
FIG. 2 is a cross-sectional view of a pulley according to a first embodiment of the invention.
Figure 4:
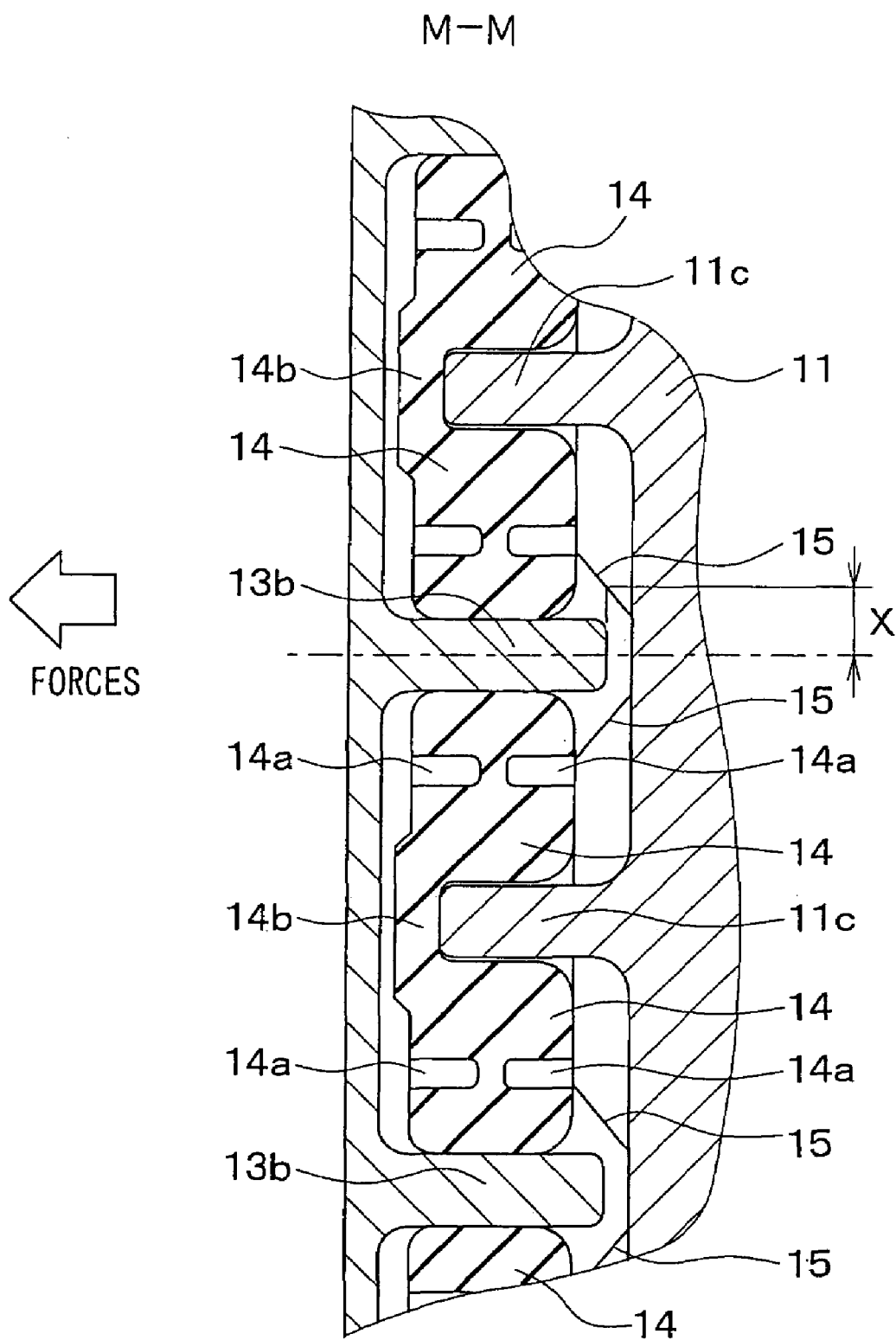
FIG. 4 is a cross-sectional view taken along the line M—M of FIG. 3.

The power transmission device according to the present invention is embodied as a pulley 10 that transmits power to a compressor 1 of a vehicle air conditioning system. FIG. 1 is a model diagram of the vehicle air conditioning system which comprises a vapor compression refrigerator, FIG. 2 is a cross-sectional view of the pulley 10, FIG. 3 is a view taken from the direction of arrow A of FIG. 2, and FIG. 4 is a cross-sectional taken along the line M—M of FIG. 3.

The vapor compression refrigerator is made up of a condenser 2 that removes heat from the high temperature, high pressure refrigerant compressed by the compressor 1 by exchanging heat with outside air to cool the refrigerant, a receiver 3 for collecting liquefied refrigerant flowing from the condenser 2 after gaseous refrigerant has been separated therefrom, an expansion valve 4 for depressurizing the liquid refrigerant supplied from the receiver 3, and an evaporator 5 for evaporating the low temperature, low pressure refrigerant, thereby absorbing heat from the air that is blown into the car interior.

The compressor 1 in this embodiment is a known variable capacity type compressor having an electronic control unit (ECU) 6 for controlling its discharge capacity. The expansion valve 4 is a thermostatic type valve that mechanically controls the degree of opening so that the refrigerant on the suction side of the compressor 1 is heated at a predetermined temperature.

The pulley 10 is constructed as described below with reference to FIG. 2 to FIG. 4. The main body 11 of the pulley 10 in FIG. 2 is a drive-source side rotating member rotated by the drive or torque from a vehicle engine 7 (see FIG. 1) through a V belt. On the inner peripheral side of this main body 11 is integrally formed a cylindrical pulley hub 11a in which is fitted a radial roller bearing 12 for rotatably supporting the main body 11. The inner race of the radial roller bearing 12 is press-fitted to a front housing of the compressor 1.

The main body 11 of the pulley 10 is designed for a poly drive belt formed with rows of V-shaped grooves 11b, and made of a hard resin material such as phenol resin in this embodiment. Correspondingly, a metal sleeve 11d is integrally formed in the pulley hub 11a by insert molding on the inner peripheral side thereof where the radial roller bearing 12 is fitted.

A center hub 13, which is a driven-device side rotating member, is located inside and coaxially with the main body 11 of the pulley 10. The center hub 13 includes a cylindrical part 13a screw-threaded on a shaft in the compressor 1, an annular part 13c formed with a plurality of projections 13b to which torque is transmitted from the main body 11 of the pulley 10, and bar-like bridges 13d extending orthogonally to the axial direction in FIG. 2 and mechanically connecting the annular pan 13c and cylindrical part 13a so as to transmit torque from the former to the latter.

The bridges 13d constitute a breakable part having a preset strength so as to break when the torque transmitted from the annular part 13c to the cylindrical part 13a exceeds the predetermined torque level. Thus the bridges 13d function as the torque limiter in this embodiment and break and interrupt torque transmission when the preset torque limit is exceeded.

The cylindrical part 13a and bridges 13d are integrally formed of sintered metal, while the annular part 13c is made of resin. The bridges 13d and annular part 13c are formed by insert molding.

The main body 11 of the pulley is integrally formed with a plurality of projections 11c protruding towards the center hub 13 as shown in FIG. 4 at a location opposite the annular part 13c. When the pulley 10 is mounted to the compressor 1, the projections 13b on the center hub 13 and projections 11c on the main body 11 of the pulley alternate each other around the rotation shaft, as shown in FIG. 3 and FIG. 4. Between each two adjacent projections 11c, 13b is fitted a damper 14 made of a resilient material such as EPDM (ethylene-propylene-dien terpolymer rubber). These dampers 14 are compressed and deformed as the projections 11c, 13b engage each other, whereby torque is transmitted from the main body 11 of the pulley to the center hub 13.

Figure 5:
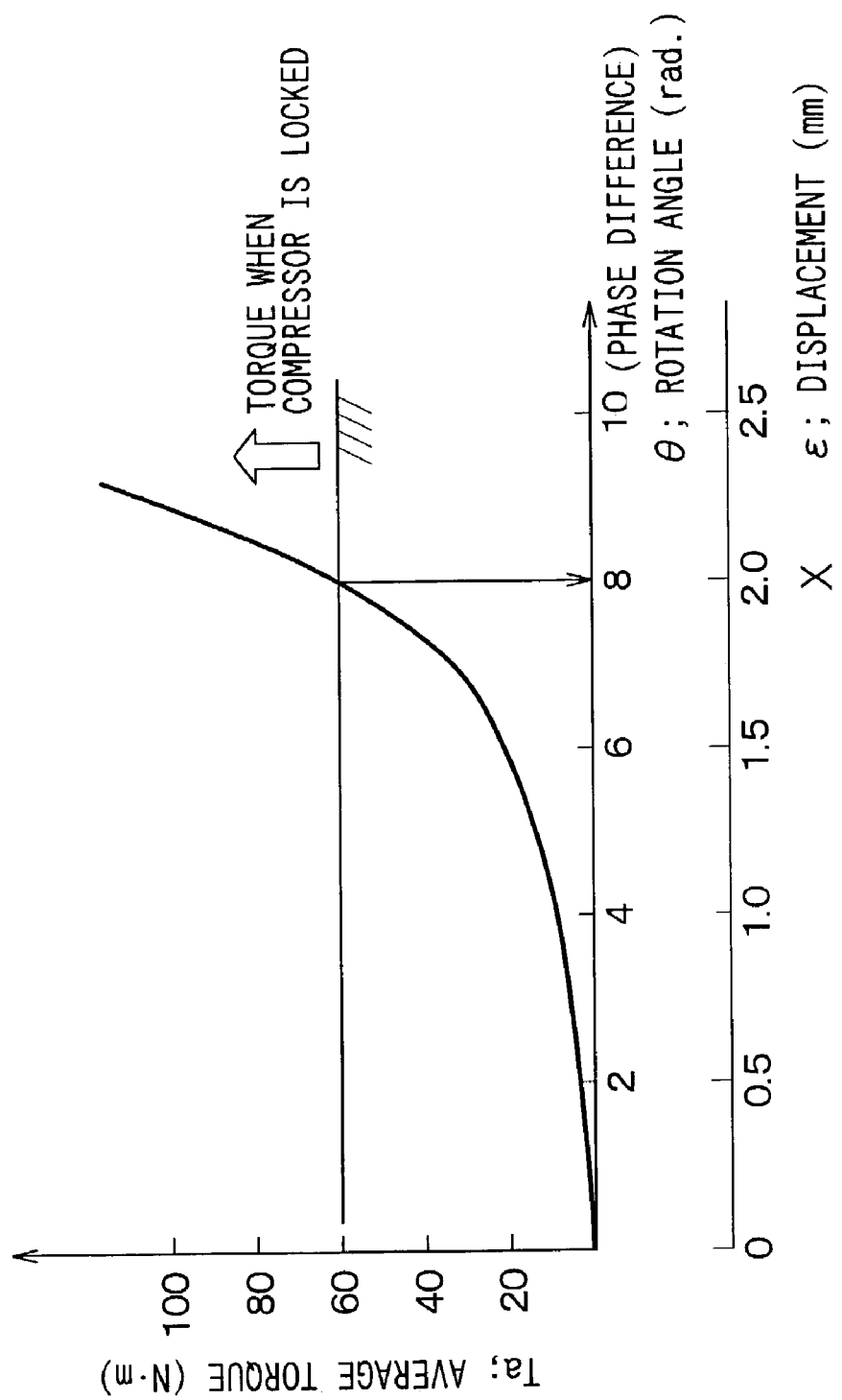
FIG. 5 is a graph showing a relation between average torque and rotation angle (phase difference) and displacement between the pulley and center hub.

In order that the ratio of compression load to the flexure amount of dampers 14, i.e., the spring coefficient of dampers 14, takes a non-linear form as shown in FIG. 5, the dampers 14 are tapered so that their cross-sectional area diminishes towards the compressing direction and further includes holes 14a which reduce the cross-sectional area of a section substantially orthogonal to the direction in which compression load is applied. At the base ends of the projections 11c are formed slanted faces 15 inclined relative to the axial direction (left-to-right direction in FIG. 4). The dampers 14 are fitted such that distal ends of the projections 13b do not touch the slanted faces 15 when the torque is under the preset limit.

In this embodiment, bridges 14b are provided for coupling together two dampers 14 on either side of the projections 11c, whereby assembly of the dampers 14 is made easy and installation of incorrectly oriented dampers is prevented.

The operation and effects of this torque limiter will be described next. Rotation of the main body 11 of the pulley operates the compressor 1 by the torque transmitted from the projections 11c via the dampers 14 to the projections 13b. Thus these projections 11c, 13b and dampers 14 form a torque transmission part for transmitting power from the pulley's main body 11 to the center hub 13.

The torque for driving the shaft in the compressor 1 changes in accordance with the rotation angle of the shaft as the compressor 1 sucks and compresses refrigerant. Any vibration due to the torque variations is absorbed by resilient deformation of the dampers 14.

Figure 6A:
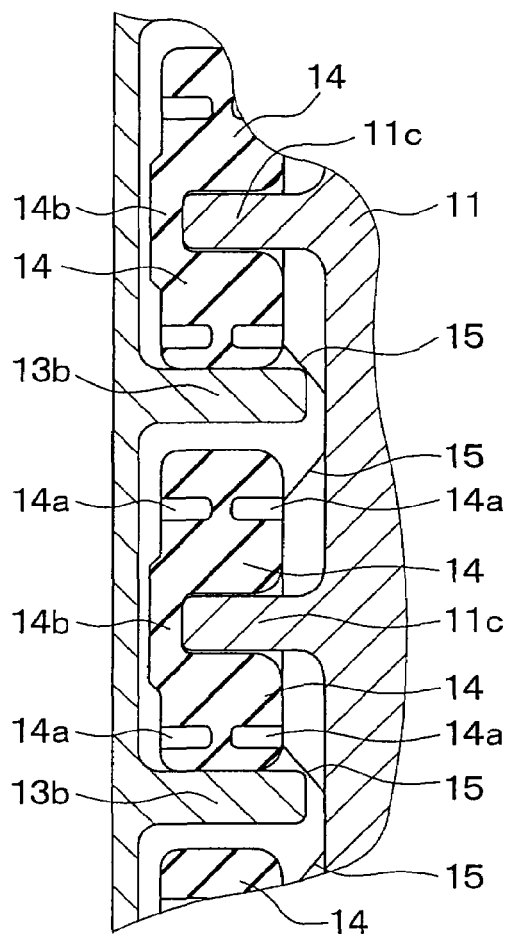
FIG. 6A is a cross-sectional view taken along line M—M of FIG. 3.

The bridges 13d transmit the torque from the annular part 13c to the cylindrical part 13a chiefly by pulling forces such as bicycle spokes would do because they are substantially tangent to the outer periphery of the cylindrical part 13a. When the torque reaches the predetermined torque level, the phase difference between the pulley's main body 11 and center hub 13 becomes small and the distal ends of the projections 13b make contact with the slanted faces 15 as shown in FIG. 6A. If the torque further increases in this state, the distal ends of the projections 13b move along the slanted faces 15, whereby the position of the center hub 13 relative to the main body 11 of the pulley is changed in the axial direction as shown in FIG. 6B.

Figure 6B:
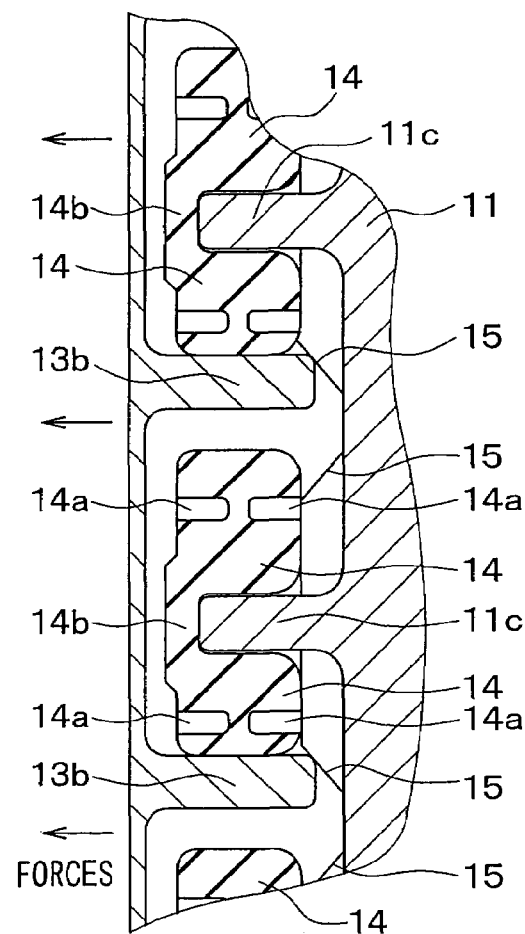
FIG. 6B is a cross-sectional view taken along line M—M of FIG. 3.

Therefore, after the torque has reached the predetermined torque level, the bridges 13d are subjected not only to the pulling forces for torque transmission but also to a bending moment caused by the displacement of the center hub 13 in the axial direction relative to the main body 11 of the pulley which is shown by arrows in FIG. 6B.

Figure 7:
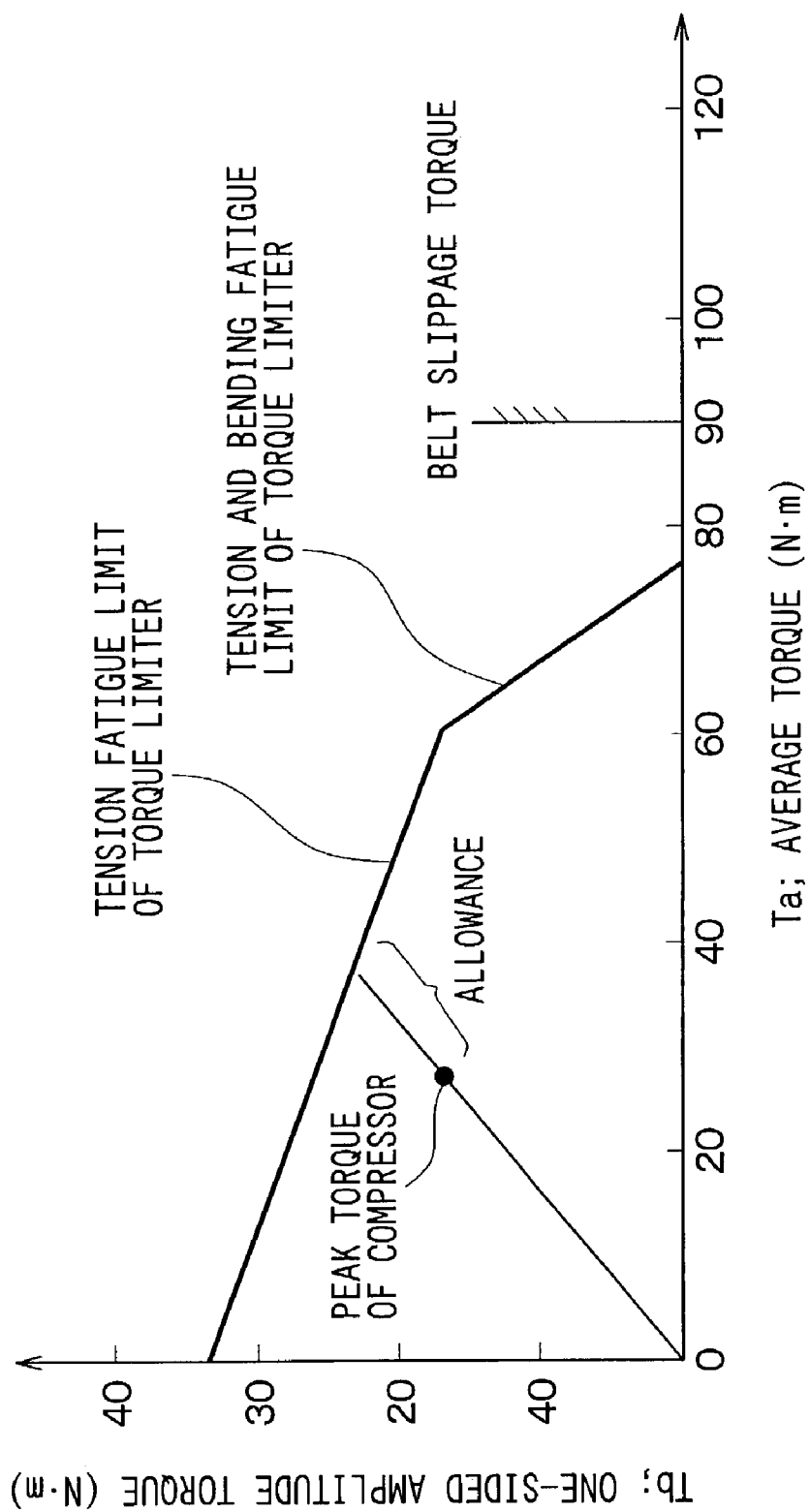
FIG. 7 is a graph indicating the fatigue limit of the pulley described in the embodiments of the invention.
Figure 11:
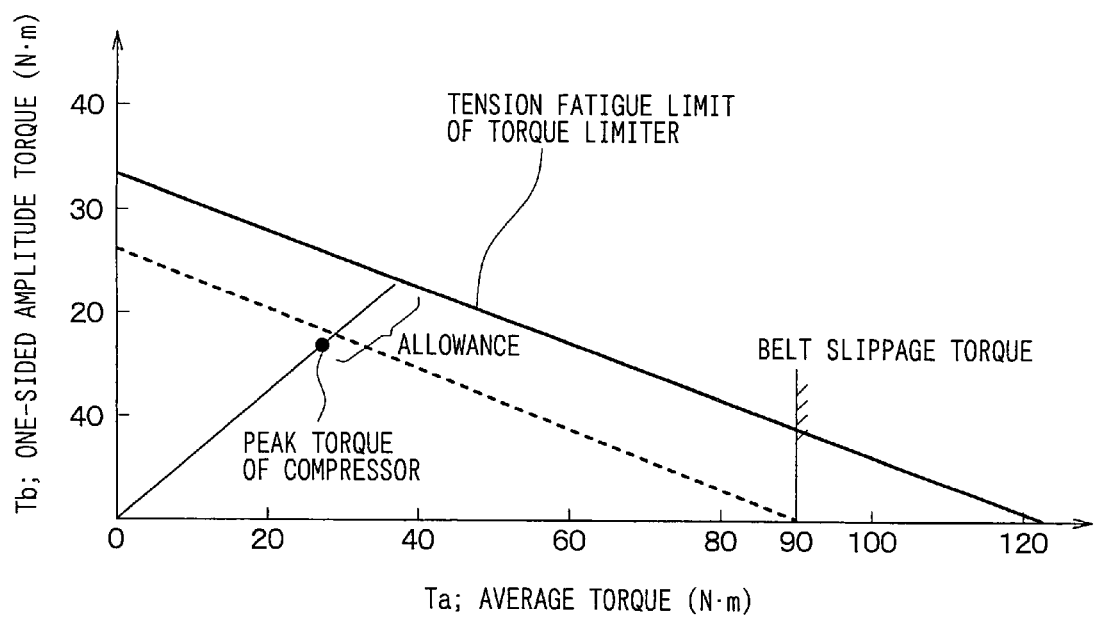
FIG. 11 is a graph indicating the fatigue limit of a conventional pulley.

Because of this, the fatigue limit of the bridges 13d in this pulley 10 is drastically reduced after the torque has exceeded the predetermined torque level as shown in FIG. 7 as compared to the case with the prior art shown in FIG. 11. Thereby, it is ensured that the bridges 13d break within the upper limit of the operation range.

In summary, the projections 11c, 13b, dampers 14, and slanted faces 15 together form means of inducing breakage of the bridges 13d which apply a force thereto when the preset torque limit is reached in a different direction from that of the forces applied to the bridges 13d when the torque is within the predetermined torque level. Thus the torque limiter of the present invention reliably interrupts torque transmission upon torque overload without sacrificing safety during normal use, i.e., without inducing fatigue fracture of the bridges 13d.

(Second Embodiment)

Figure 8A:
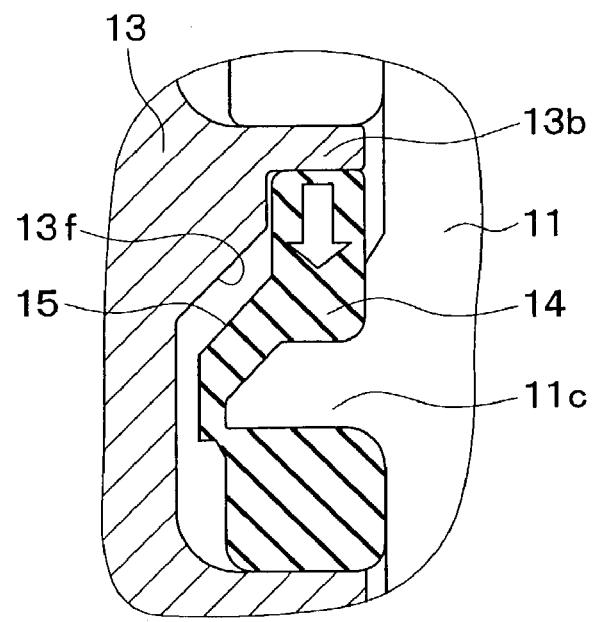
FIG. 8A is a cross-sectional view of a pulley according to a second embodiment of the invention taken along a line corresponding to line M—M of FIG. 3.
Figure 8B:
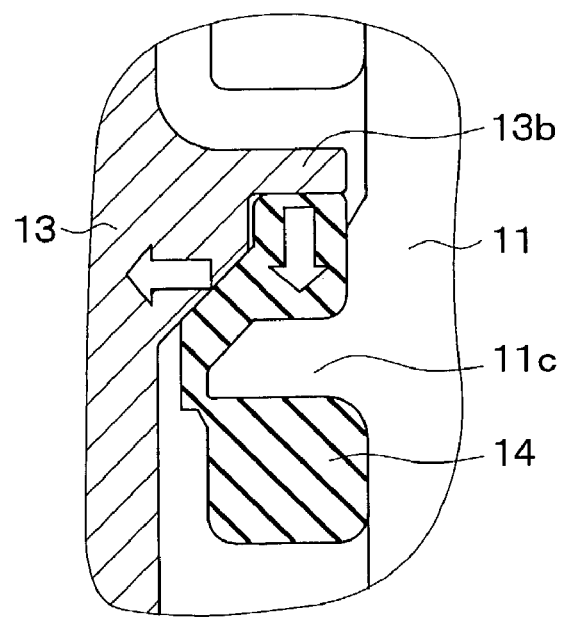
FIG. 8B is a cross-sectional view of a pulley according to a second embodiment of the invention taken along a line corresponding to line M—M of FIG. 3.

In the previous embodiment, the slanted faces 15 are formed on the main body 11 of the pulley, on which the projections 13b of the center hub 13 abut to move the center hub 13 in the axial direction. FIG. 8A and FIG. 8B show another embodiment in which slanted faces 15 are formed on the dampers 14. The center hub 13 is also formed with slanted faces 13f that are substantially parallel to the slanted faces 15. These make contact with each other when the torque exceeds the predetermined torque level and causes the center hub 13 to move in the axial direction.

(Other Embodiments)

Figure 9:
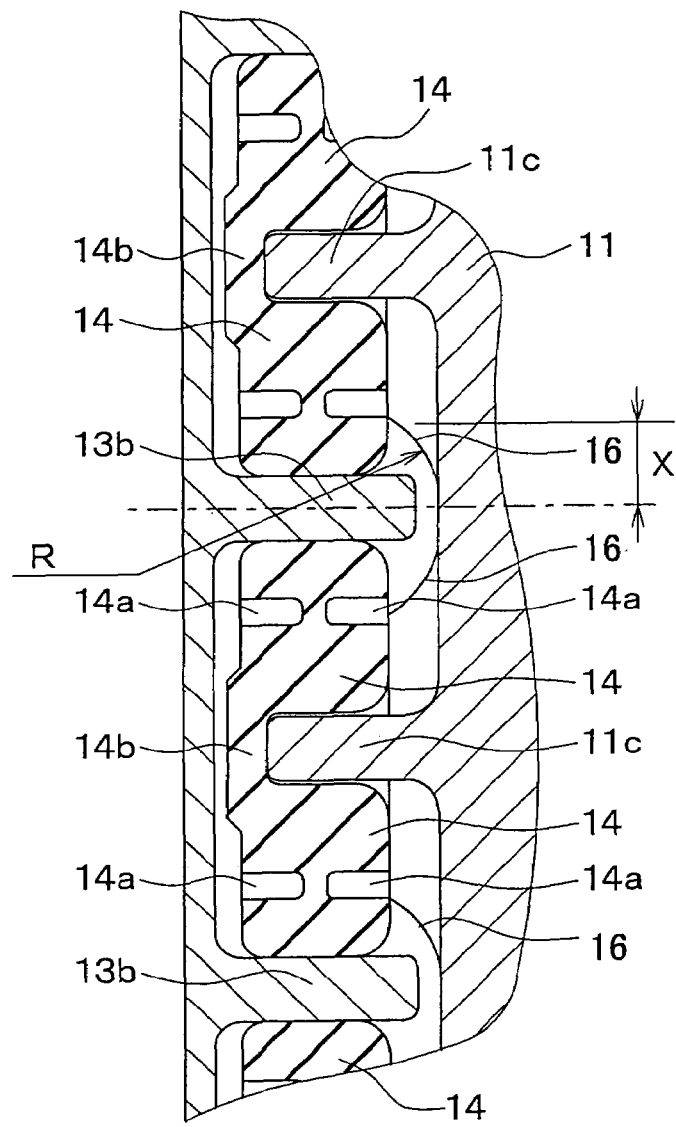
FIG. 9 is a cross-sectional view of a pulley according to another embodiment of the invention taken along a line corresponding to line M—M of FIG. 3.
Figure 10:
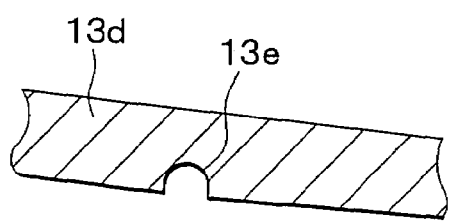
FIG. 10 is a cross-sectional view of a bridge according to one embodiment of the invention.

Various other changes and modifications may be made to the above described embodiments. For example, the slanted faces should not be limited to flat surfaces but may be formed as curved surfaces 16 as shown in FIG. 9. Also, instead of being a simple bar-like form, bridges 13d may be formed with notches 13e as shown in FIG. 10 so that bending stress will be concentrated therein.

While the above described embodiments adopt a construction in which a pulling force is chiefly applied to the bridges 13d in the range of normal use within the predetermined torque level, the present invention is not limited to such a construction. Further, in the construction of the above embodiments, a bending moment or axial force is applied to the bridges 13d, which acts in a different direction from that of the force applied to the bridges when the torque is within the predetermined torque level, but the present invention is not limited to this construction and use.

The construction may be modified such that, instead of the center hub 13, the main body 11 of the pulley is displaced, when the torque exceeds the predetermined torque level. Moreover, the slanted faces 15 may be substituted with any other suitable means such as screws for changing relative positions of the center hub 13 and the main body 11 of the pulley.

The above embodiments are designed to interrupt transmission of both forward torque from the pulley to the center hub and reverse torque from the center hub to the pulley by providing the slanted faces 15 on both the forward and reverse rotation sides as can be seen from FIG. 4. The present invention is obviously not limited to this design, and the slanted faces 15 may be provided only on one side, e.g., on the side of transmitting the forward torque.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A power transmission device for transmitting power generated by a drive source to a driven device, comprising:
    a driving-source rotating member driven to rotate by torque transmitted from said drive source;
    a driven-device rotating member operatively connected to said driven device to rotate together therewith;
    a torque transmission part for transmitting torque from said driving-source rotating member to said driven-device rotating member, including a resilient member interposed between said driving-source rotating member and said driven-device rotating member;
    a breakable part which breaks and interrupts the torque transmission when the transmitted torque exceeds a predetermined torque level; and
    means for inducing breakage that causes bending stress in said breakable part by changing relative positions of said driving-source rotating member and said driven-device rotating member in an axial direction of the rotational axis of the driven-device rotating member when a preset limit of phase difference in a direction of rotation between said driving-source rotating member and said driven-device rotating member is exceeded such that the means for inducing breakage will cause an axial force, if the phase difference between the driving-source rotating member and the driven-device rotating member exceeds the preset limit, as a result of deformation of the resilient member exceeding a predetermined amount due to a rotational force applied to the resilient member.

2. The power transmission device according to claim 1, wherein said breakable part is a bar-like member extending orthogonally to the axial direction.

3. The power transmission device according to claim 1, wherein said means for inducing breakage includes a slanted face formed on either one of said driving-source rotating member or said driven-device rotating member, and generates the axial force by contact between said slanted face and the other one of said driving-source rotating member and said driven-device rotating member, whereby the relative positions of said driving-source rotating member and said driven-device rotating member are changed in the axial direction.

4. The power transmission device according to claim 1, wherein said means for inducing breakage includes a slanted face formed at least on either one of said driven-device rotating member and said resilient member, and generates the axial force by contact between said slanted face and the other one of said driven-device rotating member and said resilient member, whereby the relative positions of said driving-source rotating member and said driven-device rotating member are changed in the axial direction.

5. The power transmission device according to claim 1, wherein the resilient member is a part of a transmission path of the power transmission device such that the torque transmission from said driving-source rotating member to said driven-device rotating member depends on force being transmitted Through the resilient member from said driving-source rotating member to said driven-device rotating member.

6. The power transmission device according to claim 1, wherein the power transmission device is located in a transmission path between an engine and a compressor of an air conditioning system.

7. A power transmission device for transmitting power generated by a drive source to a driven device, comprising:
    a driving-source rotating member, which is rotated about a rotation axis by torque transmitted from the drive source;
    a driven-device rotating member, which is operatively connected to the driven device and which rotates together with the driven device about the rotation axis;
    a torque transmission part for transmitting torque from the driving-source rotating member to the driven-device rotating member, wherein the torque transmission part includes a resilient member located between the driving-source rotating member and the driven-device rotating member;
    a breakable part, which breaks and interrupts the torque transmission when the transmitted torque exceeds a predetermined torque level; and
    a mechanism for inducing breakage of the breakable part, wherein the mechanism causes bending stress in the breakable part by changing relative positions of the driving-source rotating member and the driven-device rotating member in an axial direction of the rotational axis only when a phase difference in a direction of rotation between the driving-source rotating member and the driven-device rotating member exceeds a preset limit, wherein the mechanism will apply an axial force in to axial direction of the rotational axis to cause the bending stress only after the phase difference between the driving-source rotating member and the driven-device rotating member exceeds the preset limit as a result of deformation of the resilient member exceeding a predetermined amount due to rotational force applied to the resilient member.

8. The power transmission device according to claim 7, wherein said breakable part is a bar-like member that normally lies in a plane that is generally perpendicular to the rotational axis of the driven-device rotating member.

9. The power transmission device according to claim 7, wherein the mechanism for inducing breakage includes a slanted face formed on either one of the driving-source rotating member or the driven-device rotating member, and the mechanism generates the axial force by contact between the slanted face and the other one of the driving-source rotating member and the driven-device rotating member, whereby the relative positions of the driving-source rotating member and the driven-device rotating member are changed in the axial direction of the rotational axis.

10. The power transmission device according to claim 7, wherein the mechanism for inducing breakage includes a slated face formed at least on either one of said driven-device rotating member and said resilient member, and the mechanism generates the axial force by contact between the slanted face and the other one of said driven-device rotating member and said resilient member, whereby the relative positions of the driving-source rotating member and the driven-device rotating member are changed in the axial direction of the rotation axis.

11. The power transmission device according to claim 7, wherein the resilient member is a pan of a transmission path of the power transmission device such that the torque transmission from said driving-source rotating member to said driven-device rotating member depends on force being transmitted through the resilient member from said driving-source rotating member to said driven-device, rotating member.

12. The power transmission device according to claim 7, wherein the power transmission device is located in a transmission path between an engine and a compressor of an air conditioning system.

13. A power transmission device for transmitting power generated by a drive source to a driven device, comprising:
- a driving-source rotating member, which is rotated about a rotation axis by torque transmitted from the drive source;
- a driven-device rotating member, which is operatively connected to the driven device and which rotates together with the driven device about the rotation axis;
- a torque transmission part for transmitting torque from the driving-source rotating member to the driven-device rotating member, wherein the torque transmission part includes a resilient member located between the driving-source rotating member and the driven-device rotating member, and wherein relative rotation between the driving-source rotating member and the driven-device rotating member will deform the resilient member;
- a breakable part for transmitting torque from the driving-source rotating member to the driven-device rotating member, wherein the breakable part breaks and interrupts the torque transmission when the transmitted torque exceeds a predetermined torque level; and
- a mechanism for inducing breakage of the breakable part, wherein the mechanism applies an axial force in an axial direction of the rotation axis to shift one of the driving-source rotating member and the driven-device rotating member in the axial direction of the rotational axis to cause bending stress in the breakable part, wherein the mechanism will cause the shift only after deformation of the resilient member exceeds a predetermined amount.

14. The power transmission device according to claim 13, wherein said breakable part is a bar-like member that lies in a plane that is generally perpendicular to the rotational axis.

15. The power transmission device according to claim 13, wherein the mechanism for inducing breakage includes a slanted face formed on either one of the driving-source rotating member or the driven-device rotating member; and the mechanism generates a the axial force by contact between the slanted face and the other one of the driving-source rotating member and the driven-device rotating member.

16. The power transmission device according to claim 13, wherein the mechanism for inducing breakage includes a slanted face formed at least an either one of said driven-device rotating member and said resilient member, and the mechanism generates the axial force by contact between the slanted face and the other one of said driven-device rotating member and said resilient member, whereby the relative positions of the driving-source, rotating member and the driven-device rotating member are changed in the axial direction of the rotation axis.

17. The power transmission device according to claim 13, wherein the resilient member is a part of a transmission path of the power transmission device such that the torque transmission from said driving-source rotating member to said driven-device rotating member depends on force being transmitted through the resilient member from said driving-source rotating member to said driven-device rotating member.

18. The power transmission device according to claim 13, wherein the power transmission device is located in a transmission path between an engine and a compressor of an air conditioning system.

\* \* \* \* \*